US007458269B2

(12) United States Patent
Loesl et al.

(10) Patent No.: US 7,458,269 B2
(45) Date of Patent: Dec. 2, 2008

(54) METHOD FOR ACQUIRING VIBRATION DATA FROM ROTATING MACHINES AND PORTABLE VIBRATION MEASURING DEVICE FOR USE THEREIN

(75) Inventors: Johann Loesl, Buch am Erlbach (DE); Jan Glasebach, Munich (DE); Karl Achter, Ismaning (DE)

(73) Assignee: Prüftechnik Dieter Busch AG, Ismaning (DE)

( * ) Notice: Subject to any disclaimer, the term of this patent is extended or adjusted under 35 U.S.C. 154(b) by 391 days.

(21) Appl. No.: 11/278,159

(22) Filed: Mar. 31, 2006

(65) Prior Publication Data

US 2007/0227251 A1    Oct. 4, 2007

(51) Int. Cl.
 *G01H 1/00* (2006.01)
 *G01M 1/22* (2006.01)
(52) U.S. Cl. ...................................................... 73/660
(58) Field of Classification Search .................. 73/660, 73/593, 602, 658, 661; 340/682, 683
See application file for complete search history.

(56) References Cited

U.S. PATENT DOCUMENTS

| | | | | |
|---|---|---|---|---|
| 4,520,674 A | * | 6/1985 | Canada et al. ................. | 73/660 |
| 4,612,620 A | * | 9/1986 | Davis et al. .................. | 702/184 |
| 4,800,512 A | * | 1/1989 | Busch ......................... | 702/182 |
| 5,808,903 A | * | 9/1998 | Schiltz et al. ................ | 702/56 |
| 2005/0060123 A1 | * | 3/2005 | Schiltz et al. ............... | 702/184 |

FOREIGN PATENT DOCUMENTS

| EP | 0 998 661 B1 | 5/2000 |
|---|---|---|
| EP | 0 999 433 A2 | 5/2000 |

* cited by examiner

*Primary Examiner*—Hezron Williams
*Assistant Examiner*—Samir M Shah
(74) *Attorney, Agent, or Firm*—David S. Safran

(57) ABSTRACT

A method for acquiring vibration data from a plurality of rotating machines of a single type by using a portable vibration measuring device having means for measuring machine vibrations, means for data input, means for presenting information to a user, and a memory, is provided, which comprises: (a) uploading a measurement prescription template into the memory, the template being specific to the type of machine but unspecific to individual machines of the plurality of machines; (b) selecting an individual machine from the plurality of machines; (c) connecting the vibration measuring means to a measuring point at the individual machine; (d) acquiring vibration data by measurement from the measuring point; and (e) attributing the vibration data to the individual machine and storing the attributed vibration data in the memory; wherein the template is adapted to provide instructions regarding steps (b) to (e) to the vibration measuring device and, via the information presenting means, to the user, which instructions are specific to the type of machine but unspecific to individual machines of the plurality of machines, and wherein steps (b) to (e) are repeated for each machine of the plurality of machines.

21 Claims, 2 Drawing Sheets

METHOD FOR ACQUIRING VIBRATION DATA FROM ROTATING MACHINES AND PORTABLE VIBRATION MEASURING DEVICE FOR USE THEREIN

BACKGROUND OF THE INVENTION

1. Field of the Invention

The present invention relates to a method for acquiring vibration data from rotating machines by using a portable vibration measuring device. The invention also relates to such a portable vibration measuring device.

2. Description of Related Art

The condition of rotating machines, for example, in the paper manufacturing industry, may be monitored by regularly performing vibration measurements at specific measuring points by using a portable vibration measuring device having a vibration sensor and a data memory. In order to perform a vibration measurement at a specific measuring point, the user connects the vibration sensor to the measuring point, followed by identification of the measuring point, which can be done manually by the user by entering corresponding information into the measuring device or automatically by the vibration measuring device, if the measuring points each carry a mark which can be read by the vibration measuring device. Subsequently the vibration measurement is carried out by the measuring device and the acquired vibration data is stored in the memory of the measuring device. This procedure is repeated until all prescribed measuring points of the machine have been measured.

Often the manufacturing facility comprises not only a single machine but a plurality of rotating machines which all may be of the same type or which may be of different types. In such cases the user, after having terminated the measurements at the first machine, will continue with corresponding measurements at the other machines until all machines have been measured. Usually the measurements will be conducted according to a predetermined sequence which is also called a "route". At the end of the route the measuring device will be connected to an external database and the vibration data acquired from the measurements will be uploaded into the database for evaluation.

An example of such a portable vibration measuring device is described in EP 0 999 433 A2, which device comprises a display for presenting information to the user regarding the location of the machines to be measured and regarding the location of the measuring point at each of the machines. The measuring device is capable of automatically identifying the respective measuring point. According to the selected and identified measuring point the vibration measuring device runs a specific measuring procedure. The vibration measuring device provides the user with instructions and information via the display in order to guide the user through the entire measuring route including all machines. To this end, the memory of the measuring device stores corresponding data/information for each machine in a specific manner so that the corresponding measuring prescriptions, etc., are stored in such a manner that they are attributed to each machine specifically; i.e. they are attributed to the name of each machine (the individual machines of the same type are distinguished by specific names).

A similar portable vibration measuring device is described in U.S. Pat. No. 4,612,620, which device has stored therein the entire route, i.e. the scheduled sequence of measuring points at various machines, including measuring prescriptions attributed specifically to each individual machine.

A further similar portable vibration measuring device is described in U.S. Pat. No. 4,520,674, wherein prior to starting the vibration measurements the vibration measuring device is connected to an external database from which information regarding which measurements are to be made, upon which machines the measurements are to be made, how the vibration data should be collected, etc., is uploaded into the memory of the device, with the corresponding information being attributed specifically to the individual machines.

Further portable vibration measuring devices are known from US 2005/0060123 A1 and U.S. Pat. No. 5,808,903, wherein the measuring device includes a database with information attributed specifically to the individual machines to be measured.

U.S. Pat. No. 4,800,512 relates to a portable vibration measuring device which is capable of identifying the respective measuring points carrying a mark.

EP 0 998 661 B1 relates to a portable vibration measuring device for measuring measuring points designed as studs which include a writeable memory. Once the vibration measuring device has been connected to an individual measuring point data from the measuring point memory is uploaded into the memory of the vibration measuring device in order to identify the measuring point and to conduct the vibration measurement in the prescribed manner, whereas at the end of the measurement the acquired vibration data is written into the measuring point memory.

It is an object of the invention to provide for a method for acquiring vibration data from a plurality of rotating machines by using a portable vibration measuring device, which method should be particularly flexible but nevertheless simple to be carried out by a user.

It is a further object of the invention to provide for a portable vibration measuring device which can be used in such a method for acquiring vibration data.

SUMMARY OF THE INVENTION

According to the invention these objects are achieved by a method as defined in claims 1 and 18, respectively, and a portable vibration measuring device as defined in claims 19 and 22, respectively.

The invention is beneficial in that, by uploading—prior to starting the vibration measurements—a measurement prescription template into the memory of the measuring device which is specific to the type of machine but unspecific to the individual machines of this type and provides for instructions to the user which are specific to the type of machine but unspecific to the individual machines of this type, on the one hand the vibration measuring device can be initialized in a particularly simple manner, since only one template for each type or class of machines is necessary, while on the other hand the thus initialized vibration measuring device is particularly flexible, since at the time when the vibration measuring device is initialized it is, for example, not necessary to consider the number of machines of each type so that additional machines can be easily included in the actual measurement route even after the measuring device has been initialized.

These and further objects, features and advantages of the present invention will become apparent from the following description when taken in combination with the accompanying drawings which, for purposes of illustration only, show several embodiments in accordance with the present invention.

DETAILED DESCRIPTION OF THE INVENTION

Figure 1:
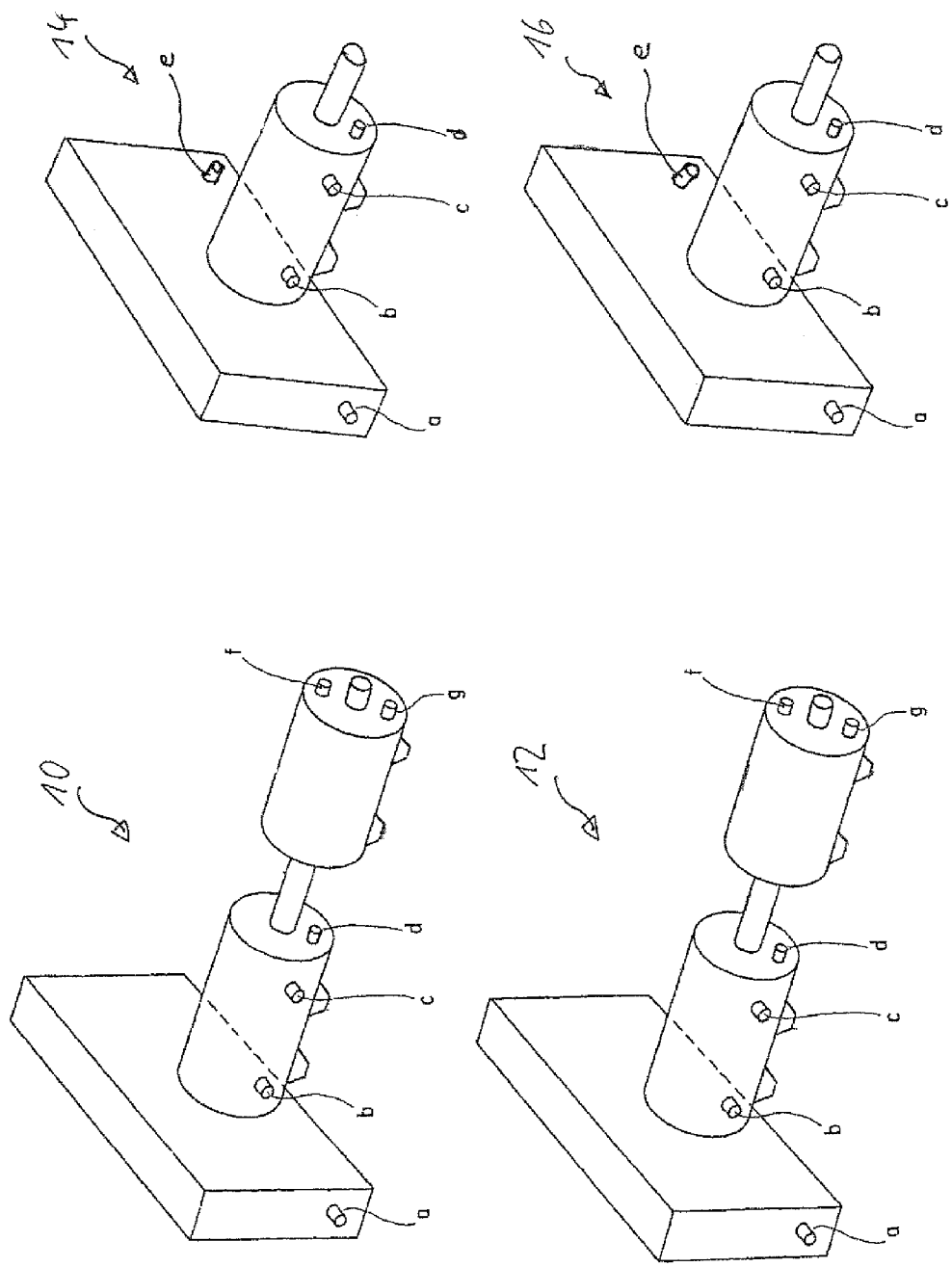
FIG. 1 is a schematic perspective view of a plurality of rotating machines with several measuring points.

FIG. 1 shows schematically a manufacturing facility comprising two rotating machines 10 and 12 of the same type which each comprises a plurality of measuring points a to g. In addition, the facility comprises two machines 14 and 16 which are of a type of machine different from that of the machines 10 and 12 and which each comprises a plurality of measuring points a to e.

Figure 2:
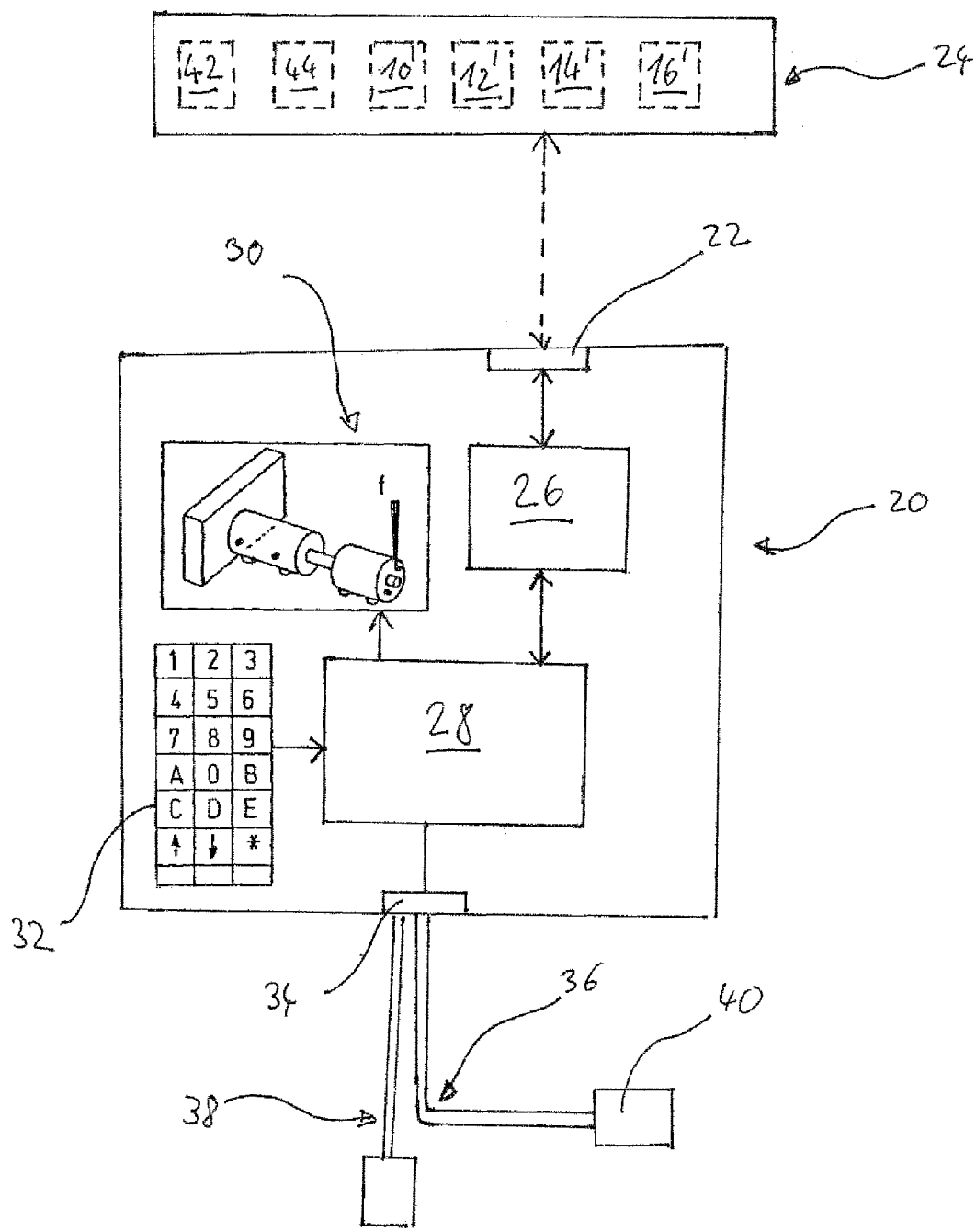
FIG. 2 is a schematic view of the functional components of a portable vibration measuring device for use with the present invention.

FIG. 2 shows a portable vibration measuring device 20 comprising an interface 22 for being connected to an external database 24 for mutual data exchange between the database 24 and a memory 26 of the vibration measuring device 20. The measuring device 20 further comprises a central control unit 28, a display 30 for presenting information to a user of the device 20, a keyboard 32 for manual data input by the user and an interface 34 for connecting a vibration sensor/transducer 36 to the device 20. The vibration sensor may be selected from a plurality of vibration sensors according to the needs of the specific measuring point a to g (for illustrative purposes, a second vibration sensor 38 is shown in FIG. 2; according to a modified embodiment all sensors may be connected to the interface 34 in parallel). The vibration sensor 36 comprises a measuring head 40 which can be connected to the respective measuring point a to g. The interfaces 22 and 34 and the keyboard 32 serve as means for data input to the vibration measuring device 20.

The external database 24, which in practice may be realized by a Personal Computer (PC), includes a measurement prescription template 42 which is specific to the type of the machines 10 and 12 and a second measurement prescription template 44 which is specific to the type of the machines 14 and 16. The templates 42 and 44 are specific only with regard to the respective type of machine, but they are unspecific to the individual machines of that type. In other words, for example, the template 42 applies only to the type of the machines 10 and 12 while it does not apply to the type of the machines 14 and 16, but template 42 does not distinguish between the machines 10 and 12. This applies analogously to the template 44.

The templates 42, 44 preferably may include information regarding the following issues: a graphical representation of the respective type of machine; the number, location and type of measuring points of that type of machine; the type of measurements to be conducted for each measuring point; the manner how these measurements are to be conducted at each measuring point, for example, the type of vibration sensor to be used, the manner of use and set-up of the respective sensor for each measuring point, the measuring procedure for each measuring point; the sequence according to which the measuring points are to be measured; prescriptions for evaluating the acquired vibration data according to the respective measuring point.

Prior to starting the measurements the measuring device 20 is connected to the database 24 via the interface 22 and the templates 42, 44 are uploaded from the database 24 into the memory 26 of the measuring device 20. Once the templates 42, 44 have been uploaded into the memory 26, the measuring program can be started. Thereupon the control unit 28 causes the display 30 to display a list of the available types of machine (in the present example there are only two different types of machine). The user has to select one of the types of machine by entering a corresponding command via the keyboard 32. As a next step, the user has to enter a name/designation into the measuring device 20 which allows to identify the individual machine the user wishes to measure first. Such identification input, which may consist e.g. in the serial number of the machine is necessary in order to enable the device 20 to attribute the vibration data which will be acquired subsequently to the respective individual machine of the selected type of machine. For example, if the machine 10 is to be measured first, the user will enter the serial number of the machine 10 via the keyboard 32.

As a next step, the control unit 28 will cause the display 30 to display the measuring points of the selected type of machine. Thereupon the user will select one of the displayed measuring points via the keyboard 32, whereupon he will be guided to the respective measuring point graphically via the display 30. In the example shown in FIG. 2 the measuring point $f$ of the machine 10 has been selected, with the location of the measuring point $f$ being marked accordingly in the display 30.

As a next step, the control unit 28 will cause the display 30 to display the measuring task(s) prescribed for the selected measuring point. If there is more than one measuring task prescribed for the selected measuring point, the user will have to select one of the displayed measuring tasks via the keyboard 32.

As a next step, the display 30 will instruct the user regarding the type of vibration sensor, for example the vibration sensor 36, to be used for the selected measuring point. The user will connect the respective vibration sensor 36 to the interface 34, and then he will connect the measuring head 40 to the respective measuring point. After the user has started the vibration measurement via the keyboard 32, the control unit 28 will automatically carry out a vibration measurement procedure which is specific to the selected measuring point f in order to acquire corresponding vibration data. In particular, the control unit 28 will provide for the respective set-up of the vibration sensor 36 and the measuring device 20. The acquired vibration data then will be stored in the memory 26 in such a manner that it is attributed to the respective measuring point.

The measurement tasks for a given measurement point may include different types of vibration measurements, and it also may include non-vibration measurements, such as electric measurements via a clip-on instrument which is connected to the measuring point. Such non-vibration measurement tasks also may include tasks like level measurements and any kind of visual inspection by the user.

As a next step, the user has to select the measurement point he wishes to measure next and the steps described above regarding the first measurement point $f$ will be repeated analogously. The user will continue to move on to the next measurement point until all prescribed measurement points of the machine have been addressed and thus all measurement tasks prescribed for the selected type of machine have been carried out.

The measurement points a-$f$ may comprise an identification mark which allows the measuring device 20 to identify the respective measuring point via the vibration sensor head when being connected to the measuring point.

The template 42 may provide for a recommendation regarding the sequence of the measuring points a-$f$, while the user may deviate from this recommended sequence. Alternatively, the template 42 may provide for a fixed sequence of the measuring points a-f which the user has to follow.

After once all measurement tasks and points prescribed for the type of the individual machine have been finished, the measuring device 20 may provide for a corresponding note to the user via the display 30.

Once the measurement tasks prescribed for the first machine (which in the example is the machine 10) have been carried out, the user will carry on to the next machine which may be of the same type (i.e. machine 12) or which may be of a different type (i.e. machines 14 and 16). If the machine 12 is selected as the next machine to be measured, the template 42 will be opened, i.e. activated, and will be used again. If the next selected machine is one of machines 14 and 16, rather the template 44 will be opened, i.e. activated, and will be used next.

As already mentioned, in order to identify the respective selected machine, the name/identification of that machine may be entered manually via the keyboard 32 by the user. Alternatively, the machines could be provided with a radio frequency identification (RFID)-tag which may be automatically read by the measuring device 20, whereby automatic identification of the individual machines is enabled.

In any case, the vibration data acquired for the respective individual machine will be stored in such a manner in the memory 26 that the name/identification of that machine is attributed to the stored vibration data.

Once the user has finished measurement of all machines, the measuring device 20 may be connected to the external database 24 via the interface 22 in order to upload the acquired vibration data stored in the memory 26 into the database 24, where it will be stored in such a manner that for each individual machine 10, 12, 14, 16 an entry 10', 12', 14', and 16', respectively, is created in the database 24 which includes the name of the machine and the acquired vibration data attributed to each of the measuring points of the individual machine. Each entry may comprise additional parameters such as the date of the measurement, etc.

According to one embodiment, the measurement device 20 may record the sequence according to which the individual machines 10, 12, 14 and 16 have been measured by the user, and this sequence may be uploaded into the database 24 together with the vibration data in order to provide for a recommendation or instruction to the user regarding the route to be used for the next measurement cycle.

If at the time when the next measurement cycle is to be performed additional machines are present at the facility, the data acquired from these machines can be easily added to the database 24. Similarly, new measurement prescription templates may be added to the database 24 if such additional machines are of a type different from those of the already existing machines.

According to one embodiment, in addition to the information/instruction regarding the acquisition of vibration data as described above the measurement prescription templates also may include information regarding maintenance measures and/or visual maintenance observations specific to the type of machine for which the template is used. In this case the user may carry out maintenance measures and/or visual maintenance observations according to information/instructions provided via the display 30, and he may enter data regarding such maintenance measures and visual maintenance observations into the measuring device 20 via the keyboard 32. Such data then will be stored in the memory 26 in such a manner that the name of the individual machine is attributed thereto. At the end of a measurement cycle such maintenance data will be uploaded into the database 24 together with the acquired vibration data.

While various embodiments in accordance with the present invention have been shown and described, it is understood that the invention is not limited thereto, and is susceptible to numerous changes and modifications as known to those skilled in the art. Therefore, this invention is not limited to the details shown and described herein, and includes all such changes and modifications as encompassed by the scope of the appended claims.

What is claimed is:

1. A method for acquiring vibration data from a plurality of rotating machines of a single type by using a portable vibration measuring device having means for measuring machine vibrations, means for data input, means for presenting information to a user, and a memory, comprising:
   (a) uploading a measurement prescription template into said memory, said template being specific to said machines of a single type but unspecific to individual machines of said plurality of machines,
   (b) selecting an individual machine from said plurality of machines,
   (c) connecting said vibration measuring means to a measuring point at said individual machine,
   (d) acquiring vibration data by measurement from said measuring point,
   (e) attributing said vibration data to said individual machine and storing said attributed vibration data in said memory,
   wherein said template is adapted to provide instructions regarding steps (b) to (e) to said vibration measuring device and, via said information presenting means, to said user, which instructions are specific to said machines of a single type but unspecific to individual machines of said plurality of machines, and wherein steps (b) to (e) are repeated for each machine of said plurality of machines.

2. The method of claim 1, wherein in step (c) said measurement point is selected by said user according to instructions of said template from a plurality of measuring points of said individual machine, and wherein steps (c) to (e) are repeated for each of the other measuring point of said plurality of measuring points.

3. The method of claim 2, wherein said vibration measuring means comprises a plurality of vibration sensors and wherein in step (c) one of said vibration sensors is selected according to instructions from said template and is connected to said measuring point for acquiring said vibration data of step (d).

4. The method of claim 2, wherein in step (c) the user is guided to said measuring point by instructions from said template.

5. The method of claim 2, wherein said information presenting means includes a display for displaying a graphical representation of a machine representative of said type of machines according to information from said template, with said measuring points being marked in said graphical representation.

6. The method of claim 2, wherein in step (d) said vibration measuring means is initialized by instructions from said template according to a selected measuring point.

7. The method of claim 2, wherein in step (d) a measurement procedure specific to said selected measuring point is carried out automatically according to instructions from said template.

8. The method of claim 2, wherein, once vibration data has been acquired by measurement from each of said measuring points of said individual machine, said user is informed accordingly via said information presenting means.

9. The method of claim 1, wherein said template includes information regarding how to evaluate said vibration data acquired for each measurement point of said individual machine.

10. The method of claim 1, wherein in step (b) said user is requested to enter a name identifying said selected individual machine into said memory via said data input means.

11. The method of claim 1, wherein each machine is provided with a radio-frequency-identification tag individually identifying each machine, wherein said measuring device comprises means for reading radio-frequency-identification tags, and wherein in step (b) said measuring device is caused by instructions from said template to read said name from said radio-frequency-identification tag.

12. The method of claim 1, wherein said attributed vibration data stored for each machine of said plurality of machines is uploaded to an external database according to instructions from said template.

13. The method of claim 1, wherein a sequence according to which of the individual machines of said plurality of machines are measured in steps (b) to (e) is recorded by said vibration measurement device and is stored in said memory.

14. The method of claim 1, wherein in step (a) said template is uploaded from an external database.

15. The method of claim 1, wherein said template is adapted to cause said information presenting means to instruct said user regarding at least one of maintenance measures and visual maintenance observations.

16. The method of claim 15, further comprising: carrying out said maintenance measures and visual maintenance observations by said user, wherein said user enters, via said data input means, data regarding said maintenance measures and visual maintenance observations into said memory.

17. The method of claim 16, wherein said data regarding said maintenance measures and visual maintenance observations is uploaded to an external data base.

18. A portable vibration measuring device for acquiring vibration data from a plurality of rotating machines of the same type, comprising: means for measuring machine vibrations, means for data input, means for presenting information to a user, and a memory, said memory having stored therein a measurement prescription template which is specific to said machines of the same type but unspecific to individual machines of said plurality of machines and which is capable of providing instructions, which are specific to said machines of the same type but unspecific to individual machines of said plurality of machines, to said vibration measuring device and, via said information presenting means, to said user, said instructions relating to the following steps: selecting an individual machine from said plurality of machines, connecting said vibration measuring means to a measuring point at said individual machine, acquiring vibration data by measurement from said measuring point, and attributing said vibration data to said individual machine and storing said attributed vibration data in said memory.

19. The device of claim 18, wherein said template includes information regarding at least one selected from the group consisting of: location and type of measuring points, manner of use and set-up of said vibration measuring means for each measuring point, measuring procedure for each measuring point, prescriptions for evaluating the acquired vibration data according to the measuring point.

20. The device of claim 19, wherein said vibration measuring means includes a plurality of vibration sensors and wherein said information regarding manner of use and set-up of said vibration measuring means includes information regarding the type of sensor to be used for each measuring point, and the set-up of each sensor for the respective measuring point.

21. A portable vibration measuring device for acquiring vibration data from a first plurality of rotating machines of the same first type and from a second plurality of rotating machines of the same second type, comprising: means for measuring machine vibrations, means for data input, means for presenting information to a user, and a memory, said memory having stored therein a first measurement prescription template which is specific to said machines of the same first type but unspecific to individual machines of said first plurality of machines and a second measurement prescription template which is specific to said machines of the same second type but unspecific to individual machines of said second plurality of machines, wherein said first template is capable of providing instructions, which are specific to said machines of the same first type but unspecific to individual machines of said first plurality of machines, to said vibration measuring device and, via said information presenting means, to said user, said instructions relating to the following steps: selecting an individual machine from said first plurality of machines, connecting said vibration measuring means to a measuring point at said individual machine, acquiring vibration data by measurement from said measuring point, and attributing said vibration data to said individual machine and storing said attributed vibration data in said memory, and wherein said second template is capable of providing instructions, which are specific to said machines of the same second type but unspecific to individual machines of said second plurality of machines, to said vibration measuring device and, via said information presenting means, to said user, said instructions relating to the following steps: selecting an individual machine from said second plurality of machines, connecting said vibration measuring means to a measuring point at said individual machine, acquiring vibration data by measurement from said measuring point, and attributing said vibration data to said individual machine and storing said attributed vibration data in said memory.

* * * * *